Jan. 8, 1924.

C. P. BETTENGA

WATERING DEVICE

Filed March 31, 1923

1,480,367

Inventor
C. P. Bettenga
By G. C. Kennedy
Attorney

Patented Jan. 8, 1924.

1,480,367

UNITED STATES PATENT OFFICE.

CRENO P. BETTENGA, OF WATERLOO, IOWA.

WATERING DEVICE.

Application filed March 31, 1923. Serial No. 629,000.

*To all whom it may concern:*

Be it known that I, CRENO P. BETTENGA, a citizen of the United States of America, and a resident of Waterloo, Blackhawk County, Iowa, have invented certain new and useful Improvements in Watering Devices, of which the following is a specification.

My invention relates to improvements in watering devices, and the objects of my improvements are to supply in a watering device for poultry or animals, first, an interior porous container for dissolvable food substances subjected to the action of water in the storage reservoir of the device; second, to provide a float operated valve to control the delivery of the discharge port of said reservoir having thereon a filtering device to initially receive fluid discharged from said port, and third, to so medicinally compound the substances of said filter as to cause the filter to also therapeutically impregnate the fluid traversing and cleansed by the filter.

Figure 1:
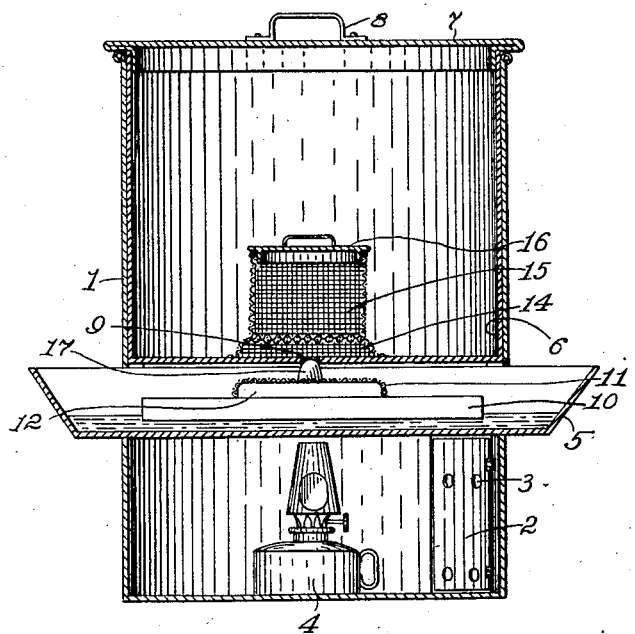
Figure 2:
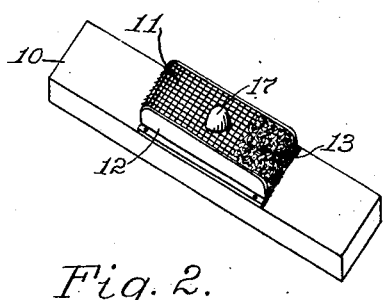

These objects are accomplished by the means which are hereinafter described and claimed, and which are illustrated in the accompanying drawings, in which Fig. 1 is a central vertical cross section of my improved watering device, and Fig. 2 is a perspective detail view of the filter-carrying float of the device.

This device comprises a hollow cylindrical housing 1, closed at the bottom and open at the top. A closed bottom open top water reservoir 6 is supported within the upper part of the housing 1 on brackets, removably, and has a top closure 7 with handle 8. In the center of the bottom of the reservoir is a discharge-port 9, surrounded by a reticulated raised cover 14, and a reticulated container 15 is removably mounted upon this cover and provided with a removable cover 16.

Apertures are provided in opposite sides of the housing 1, and an elongated open top drinking trough with sloping ends is positioned across the housing spaced from the bottom thereof and immediately below the bottom of the reservoir 6, with its opposite ends projecting through said apertures to serve as supply founts for poultry or animals, as desired, and according to the proper sizes for the purpose.

A hollow elongated float 10, made of imperforate sheet metal, or of any other suitable buoyant material is placed in the trough 5. Upon the middle of the upper face of said float a quantity of filtering substance, such as charcoal or the like at 13 is placed and surrounded by an inclosure 11 of porous nature, such as wire netting, and the longitudinal sides of the inclosure are covered by imperforate metal plates 12 mounted on the float. Upon the inclosure top is fixed a dome-shaped valve-body 17 below and alined with the discharge-port 9 to control the discharge thereof according to the movements of the float upon the water in said trough.

In the hollow of the housing 1 beneath the trough 5 may be placed heating-means of any desired kind in cold weather, such as a hand-lamp 4 by way of a door 2 having ventilating apertures 3. Water in said trough may thus be heated to a suitable degree in the winter.

In practice, before the reservoir 6 is filled with water, a quantity of dissolvable substance such as tankage, may be placed in the reticulated container 15, the water when placed in the reservoir gradually dissolving this substance to become impregnated therewith. This substance may be medicated if desired.

However, as I desire to add medicaments to the contents of the filter 13, when water is discharged from the port 9 upon the filter as the float subsides on lowering of the contents of the trough, the medicaments in the filter are partially dissolved and impregnate the water which traverses the filter and is cleansed thereby. This insures a proper therapeutic treatment of the water at times when the reticulated container is not used.

It will be understood that when the water in the trough rises to a determined level, the float in rising causes the valve-head to close the discharge-port 9 until such time as a lowering of the water in the trough causes subsidence of the float and valve. Water discharged wholly upon the filter must traverse it before entering the trough, the imperforate plates 12 along the sides of the reticulated inclosure 11 preventing escape of the water prematurely in that shortest way, forcing it to permeate the whole filter and escape at the ends only. The filter drys out when the valve closes said discharge-port, and is thus ready for a further charge of water.

Having described my invention, what I claim as new, and desire to secure by Letters Patent, is:

1. In a device of the character described, a reservoir having a discharge-port, a drinking trough positioned below said port, a float in said trough having a valve-head adapted to control the discharge of said port, and filtering material mounted upon said float to initially receive the discharge of said port.

2. In a device of the character described, a reservoir having a discharge-port, a drinking trough positioned below said port, a float in said trough having a valve-head adapted to control the discharge of said port, and filtering material including a dissoluble medicament mounted upon the top of said float to initially receive the discharge from said port.

3. In a device of the character described, a reservoir having a discharge-port, a drinking trough positioned below said port, a float in said trough having a valve-head adapted to control the discharge of said port, a porous inclosure mounted upon the top of said float under said valve-head, and porous filtering substances within said inclosure adapted to initially receive the discharge of said port.

4. In a device of the character described, a reservoir having a discharge-port, a drinking trough positioned below said port, a float in said trough having a valve-head adapted to control the discharge of said port, a porous inclosure mounted upon the top of said float, a filtering substance within said inclosure, and imperforate plates mounted on said float to inclose opposite sides of said porous inclosure to restrict the delivery thereof to its open ends only.

5. In a device of the character described, a reservoir having a discharge-port, a drinking trough supported below said reservoir to receive from said discharge-port, a reticulated container supported within said reservoir, a float in said drinking trough having a valve-head thereon adapted to control the discharge of said port, a reticulated inclosure upon the top of said float to initially receive the discharge of said port, and a filtering substance filling said inclosure.

6. In a device of the character described, a hollow open top housing having an opening in a side thereof, a drinking trough mounted across the interior of the housing with an open end projecting outwardly through said side opening, heating means in said housing below said trough, a reservoir supported removably in said housing above said trough and having a bottom discharge-port, a float in said trough having a valve-head adapted to control the discharge of said port, a reticulated inclosure mounted upon the top of said float about said valve-head to initially receive the discharge from said port, and a filtering material within said inclosure.

Signed at Waterloo, Iowa, this 27th day of Feb. 1923.

CRENO P. BETTENGA.